United States Patent
Gupta et al.

(10) Patent No.: US 9,424,084 B2
(45) Date of Patent: Aug. 23, 2016

(54) SYSTEMS, METHODS, AND MEDIA FOR ONLINE SERVER WORKLOAD MANAGEMENT

(71) Applicants: Sandeep Gupta, Phoenix, AZ (US); Zahra Abbasi, Tempe, AZ (US)

(72) Inventors: Sandeep Gupta, Phoenix, AZ (US); Zahra Abbasi, Tempe, AZ (US)

(*) Notice: Subject to any disclaimer, the term of this patent is extended or adjusted under 35 U.S.C. 154(b) by 0 days.

(21) Appl. No.: 14/717,908

(22) Filed: May 20, 2015

(65) Prior Publication Data

US 2015/0339159 A1 Nov. 26, 2015

Related U.S. Application Data

(60) Provisional application No. 62/000,841, filed on May 20, 2014.

(51) Int. Cl.
  *G06F 9/46* (2006.01)
  *G06F 9/48* (2006.01)
  *G06F 9/50* (2006.01)

(52) U.S. Cl.
  CPC .............. *G06F 9/4881* (2013.01); *G06F 9/48* (2013.01); *G06F 9/4893* (2013.01); *G06F 9/50* (2013.01); *G06F 9/5027* (2013.01); *G06F 9/5094* (2013.01)

(58) Field of Classification Search
  None
  See application file for complete search history.

(56) References Cited

U.S. PATENT DOCUMENTS

| 7,962,769 B1 | 6/2011 | Patel et al. |
| 7,979,250 B2 | 7/2011 | Archibald et al. |
| 2007/0040263 A1 | 2/2007 | Towada |
| 2009/0201293 A1 | 8/2009 | Tung et al. |
| 2010/0292976 A1 | 11/2010 | Newcombe et al. |
| 2011/0011110 A1 | 1/2011 | Hanson et al. |
| 2011/0154327 A1* | 6/2011 | Kozat ............... G06F 9/505 718/1 |
| 2011/0202655 A1 | 8/2011 | Sharma et al. |
| 2012/0060167 A1 | 3/2012 | Salsburg et al. |
| 2013/0212410 A1 | 8/2013 | Li et al. |
| 2015/0261898 A1 | 9/2015 | Gupta et al. |

OTHER PUBLICATIONS

Zhou et al. "Carbon-aware Load Balancing for Geo-distributed Cloud Services," Aug. 14-16, 2013, IEEE.*
Abbasi et al. "Online server and workload management for joint optimization of electricity cost and carbon footprint across data centers," May 19-23, 2014, IEEE.*

(Continued)

*Primary Examiner* — Sisley Kim
(74) *Attorney, Agent, or Firm* — Byrne Poh LLP

(57) ABSTRACT

Methods, using a hardware processor, for online server workload management are provided, comprising: receiving information regarding client device requests; determining, using a hardware processor, a workload distribution for the requests based on electricity cost and carbon footprint of one or more data centers using Lyapunov optimization; sending the workload distribution to the one or more data centers; and causing servers in the one or more data center to be active or inactive based on the workload distribution. Systems are provided, comprising at least one hardware processor configured to: receive information regarding client device requests; determine a workload distribution for the requests based on electricity cost and carbon footprint of one or more data centers using Lyapunov optimization; send the workload distribution to the one or more data centers; and cause servers in the one or more data center to be active or inactive based on the workload distribution.

9 Claims, 3 Drawing Sheets

(56) References Cited

OTHER PUBLICATIONS

Abbasi, Z. et al., "Thermal Aware Server Provisioning and Workload Distribution for Internet Data Centers", In Proceedings of the 19th ACM International Symposium on High Performance Distributed Computing, Chicago, IL, US, Jun. 20-25, 2010, pp. 130-141.
Abbasi, Z. et al., "TACOMA: Server and Workload Management in Internet Data Centers Considering Cooling-Computing Power Trade-Off and Energy Proportionality", In ACM Transactions on Architecture Code Optimization, vol. 9, No. 2, Jun. 2012, pp. 1-35.
Gandhi, A. et al., "Optimal Power Allocation in Server Farms", Technical Report CMU-CS-09-113, Mar. 2009, pp. 1-35.
Banerjee, A. et al., "Cooling-Aware and Thermal-Aware Workload Placement for Green HPC Data Centers", In Proceedings of the International Conference on Green Computing Conference (IGCC '10), Chicago, IL, US, Aug. 15-18, 2010, pp. 245-256.
Banerjee, A. et al., "Integrating Cooling Awareness with Thermal Aware Workload Placement for HPC Data Centers", In Sustainable Computing: Informatics and Systems, vol. 1, No. 2, Jun. 2011, pp. 134-150.
The Green Grid, "Green Grid Metrics: Describing Datacenter Power Efficiency", Technical Committee White Paper, Feb. 20, 2007, pp. 1-8.
Gandhi, A. et al., "Optimal Power Allocation in Server Farms", In Proceedings of the 11th Joint Conference on Measurement and Modeling, Seattle, WA, US, Jun. 15-19, 2009, pp. 157-168.
Gupta, S. et al., "Bluetool: Using a Computing Systems Research Infrastructure Tool to Design and Test Green and Sustainable Data Centers," In Handbook of Energy-Aware and Green Computing, 1st Edition, Chapman & Hall/CRC, 2012, pp. 1-22.
Gupta, S.K.S. et al., "GDCSim: A Simulator for Green Data Center Design and Analysis," In ACM Transactions on Modeling and Computer Simulation, vol. 24, No. 1, Jan. 2014, article No. 3, pp. 1-27.
Gupta, S.K.S. et al., "GDCSim: A Tool for Analyzing Green Data Center Design and Resource Management Techniques", In Proceedings of the 2011 International Green Computing Conference and Workshops, Jul. 25-28, 2011, Orlando, FL, US, pp. 1-8.
Gupta, S.K.S. et al., "Research Directions in Energy-Sustainable Cyberphysical Systems", In Elsevier Comnets Special Issue in Sustainable Computing (SUSCOM), Mar. 2011, pp. 57-74.
Mukherjee, T. et al., "Spatio-Temporal Thermal-Aware Job Scheduling to Minimize Energy Consumption in Virtualized Heterogeneous Data Centers", In Computer Networks, vol. 53, No. 17, Dec. 2009, pp. 2888-2904.
Mukherjee, T., "Model-Driven Coordinated Management of Data Centers", In Computer Networks: Managing Emerging Computing Environments, vol. 54, No. 16, Nov. 2010, pp. 2869-2886.
Tang, Q., "Thermal-Aware Scheduling in Environmentally Coupled Cyber-Physical Distributed Systems", Ph.D. dissertation, Arizona State University, Aug. 2008, pp. 1-136.
Tang, Q. et al., "Energy-Efficient Thermal-Aware Task Scheduling for Homogeneous High-Performance Computing Data Centers: A Cyber-Physical Approach", In IEEE Transactions on Parallel and Distributed Systems, Special Issue on Power-Aware Parallel and Distributed Systems, vol. 19, No. 11, Nov. 2008, pp. 1458-1472.
Tang, Q. et al., "Thermal-Aware Task Scheduling for Data Centers through Minimizing Heat Recirculation", In Proceedings of the IEEE Conference on Cluster Computing, Austin, TX, US, Sep. 2007, pp. 129-138.
Tang, Q. et al., "Thermal-Aware Task Scheduling to Minimize Energy Usage for Blade Servers", In Proceedings of the 2nd IEEE Dependable, Autonomic, and Secure Computing Conference, Indianapolis, IN, US, Sep. 29-Oct. 1, 2006, pp. 195-202.
Tang, Q. et al., "Sensor-Based Fast Thermal Evaluation Model for Energy Efficient High-Performance Datacenters", In Proceedings of the 4th Conference on Intelligent Sensing and Information Processing, Bangalore, IN, Oct. 15-Dec. 18, 2006, pp. 203-208.
Varsamopolous, G. et al., "Trends and Effects of Energy Proportionality on Server Provisioning in Data Centers", In Proceedings of the International Conference on High Performance Computing, Dec. 2010, pp. 1-11.
Varsamopoulos, G. et al., "Energy Efficiency of Thermal-Aware Job Scheduling Algorithms under Various Cooling Models", In Proceedings of the International Conference on Contemporary Computing IC3, Noida, IN, Aug. 17-19, 2009, pp. 568-580, available at: http://impact.asu.edu/thesis/Varsamopoulos2009-cooling-models.pdf.
Varsamopoulos, G. et al., "Using Transient Thermal Models to Predict Cyberphysical Phenomena in Data Centers", In computing: Informatics and Systems, vol. 3, No. 3, Sep. 2013, pp. 132-147.
Gao, P.X. et al., "It's Not Easy Being Green", In ACM SIGCOMM Computer Communication Review, vol. 42, No. 4, Oct. 2012, pp. 211-222.
Georgiadis, L. et al., "Resource Allocation and Cross-Layer Control in Wireless Networks", Now Publishers Inc, 2006, pp. 1-145.
Neely, M.J., "Energy Optimal Control for Time-Varying Wireless Networks", In IEEE Transactions on Information Theory, vol. 52, No. 7, Jul. 2006, pp. 2915-2934.
Le, K. et al., "Capping the Brown Energy Consumption of Internet Services at Low Cost", In IEEE International Green Computing Conference (IGCC '10), Chicago, IL, US, Aug. 15-18, 2010, pp. 3-14.
Qureshi, A. et al., "Cutting the Electric Bill for Internet-Scale Systems", In Proceedings of ACM SIGCOMM, Oct. 2009, pp. 123-134.
Rao, L. et al., "Minimizing Electricity Cost: Optimization of Distributed Internet Data Centers in a Multi-Electricity-Market Environment", In Proceedings IEEE INFOCOM, San Diego, CA, US, Mar. 14-19, 2010, pp. 1-9.
Abbasi, Z. et al., "DAHM: A Green and Dynamic Web Application Hosting Manager across Geographically Distributed Data Centers", In ACM Journal on Emerging Technology (JETC), vol. 8, No. 4, Nov. 2012, pp. 34:1-34:22.
Liu, Z. et al., "Greening Geographical Load Balancing", In Proceedings ACM SIGMETRICS, Jun. 2011, pp. 233-244.
Ren, S. et al., "COCA: Online Distributed Resource Management for Cost Minimization and Carbon Neutrality in Data Centers", In Super Computing, Nov. 2013, pp. 1-12.
Mahmud, A.H. et al., "Online Capacity Provisioning for Carbon-Neutral Data Center with Demand-Responsive Electricity Prices", In ACM SIGMETRICS Performance Evaluation Review, vol. 41, No. 2, Sep. 2013, pp. 26-37.
Zhou, Z. et al., "Carbon-Aware Load Balancing for Geo-Distributed Cloud Services", in IEEE Mascots, San Francisco, CA, US, Aug. 14-16, 2013, pp. 232-241.
Saroiu, S. et al., "An Analysis of Internet Content Delivery Systems", In ACM SIGOPS Operating Systems Review, vol. 36, No. SI, Winter 2002, pp. 315-327.
Bent, L. et al., "Characterization of a Large Web Site Population with Implications for Content Delivery", In Proceedings of the ACM International Conference on World Wide Web, New York, NY, US, May 17-22, 2004, pp. 522-533.
Zhang, Y. et al., "Greenware: Greening Cloud-Scale Data Centers to Maximize the Use of Renewable Energy", In Middleware, 2011, pp. 143-164.
Thereska, E. et al., "Sierra: a Power-Proportional, Distributed Storage System", Microsoft Research, Technical Report, Nov. 2009, pp. 1-15.
Abbasi, Z. et al., "Online Server and Workload Management for Joint Optimization of Electricity Cost and Carbon Footprint across Data Centers", In 2014 IEEE 28th International Parallel and Distributed Processing Symposium, May 19-23, 2014, pp. 317-426.

* cited by examiner

SYSTEMS, METHODS, AND MEDIA FOR ONLINE SERVER WORKLOAD MANAGEMENT

CROSS REFERENCE TO RELATED APPLICATION

This application claims the benefit of U.S. Provisional Patent Application No. 62/000,841, filed May 20, 2014, which is hereby incorporated by reference herein in its entirety.

STATEMENT REGARDING GOVERNMENT FUNDED RESEARCH

This invention was made with government support under CRI project #0855277, grant #0834797, and grant #1218505 awarded by the National Science Foundation. The government has certain rights in the invention.

BACKGROUND

Internet data centers are typically distributed across the world in order to provide timely and reliable Internet service to users. It is estimated that data centers consume 2% of the U.S. electrical grid capacity, resulting in a $2 billion monthly utility bill. Furthermore, it is estimated that the carbon dioxide ($CO_2$) emissions from data centers will exceed emissions from the airline industry by the year 2020. Data centers will soon be required to abide by carbon capping policies that impose carbon footprint limits to encourage brown energy conservation. However, given the scale and distribution of data centers, workload scheduling of data centers based on electricity cost and carbon footprint reduction is not easy to implement.

Accordingly, it is desirable to provide systems, methods, and media for online server workload management.

SUMMARY

In some embodiments, methods, using a hardware processor, for online server workload management, the method comprising: receiving information regarding client device requests; determining, using a hardware processor, a workload distribution for the requests based on electricity cost and carbon footprint of one or more data centers using Lyapunov optimization; sending the workload distribution to the one or more data centers; and causing servers in the one or more data center to be active or inactive based on the workload distribution.

In some embodiments, systems for online server workload management are provided, the systems comprising at least one hardware processor configured to: receive information regarding client device requests; determine a workload distribution for the requests based on electricity cost and carbon footprint of one or more data centers using Lyapunov optimization; send the workload distribution to the one or more data centers; and cause servers in the one or more data center to be active or inactive based on the workload distribution.

In some embodiments, non-transitory computer readable media containing computer-executable instructions that, when executed by a processor, cause the processor to perform methods for online server workload management are provided, the methods comprising: receiving information regarding client device requests; determining a workload distribution for the requests based on electricity cost and carbon footprint of one or more data centers using Lyapunov optimization; sending the workload distribution to the one or more data centers; and causing servers in the one or more data center to be active or inactive based on the workload distribution.

BRIEF DESCRIPTION

DETAILED DESCRIPTION

In accordance with some implementations of the disclosed subject matter, mechanisms for online server workload management are provided. These mechanisms can be used for a variety of applications, such as large scale Internet applications that are deployed to a cloud of data centers across the world. In some implementations, these mechanisms can provide a workload routing and server management protocol for geo-distributed data centers that can minimize the data center operational electricity cost and carbon footprint.

In some embodiments, there can be N geographically distributed data centers, each containing at most $Y_i$ servers. The servers can have two power states: active and inactive, with zero (or nearly zero) power consumption in the inactive state and the servers in a data center can be homogeneous in terms of their service rate and power consumption, in accordance with some embodiments. Requests of client devices can first arrive at the front-end proxy servers. The proxy servers can distribute the requests to data centers according a workload distribution determined by a management server. In some embodiments, there can be M such front-end proxy servers.

In some embodiments, a discrete-time model can be used. For example, a budgeting period (e.g., which can be year, a month, or any other suitable period of time) can be divided into S time slots, each of which can have any suitable duration (e.g., a duration that is short enough to capture the electricity cost variation, yet long enough to prevent computation and network overhead from overly impacting use of the model). At each slot, the workload management solution can reconcile a number of competing objectives, such as reducing the electricity cost, maintaining a maximum delay requirement for the requests, meeting a cloud carbon footprint cap, and/or any other suitable number and/or form of competing objectives, in accordance with some embodiments. In some embodiments, the mechanisms described herein determine: (i) the workload distribution of data centers, denoted by $\lambda_{i,j}(t)$, i.e., the workload arrival rate from front-end j to data center i, and (ii) the number of active servers at each data center i, denoted by $y_i(t)$ (the rest of the servers i.e., $Y_i - y_i(t)$ can be set to inactive to save the unnecessary idle power). In some embodiments, the Internet workload for data centers can be delay sensitive and the data centers can power their servers from both the onsite renewable energy, denoted by $r_i$, and the grid energy, denoted by $g_i$.

Figure 1:
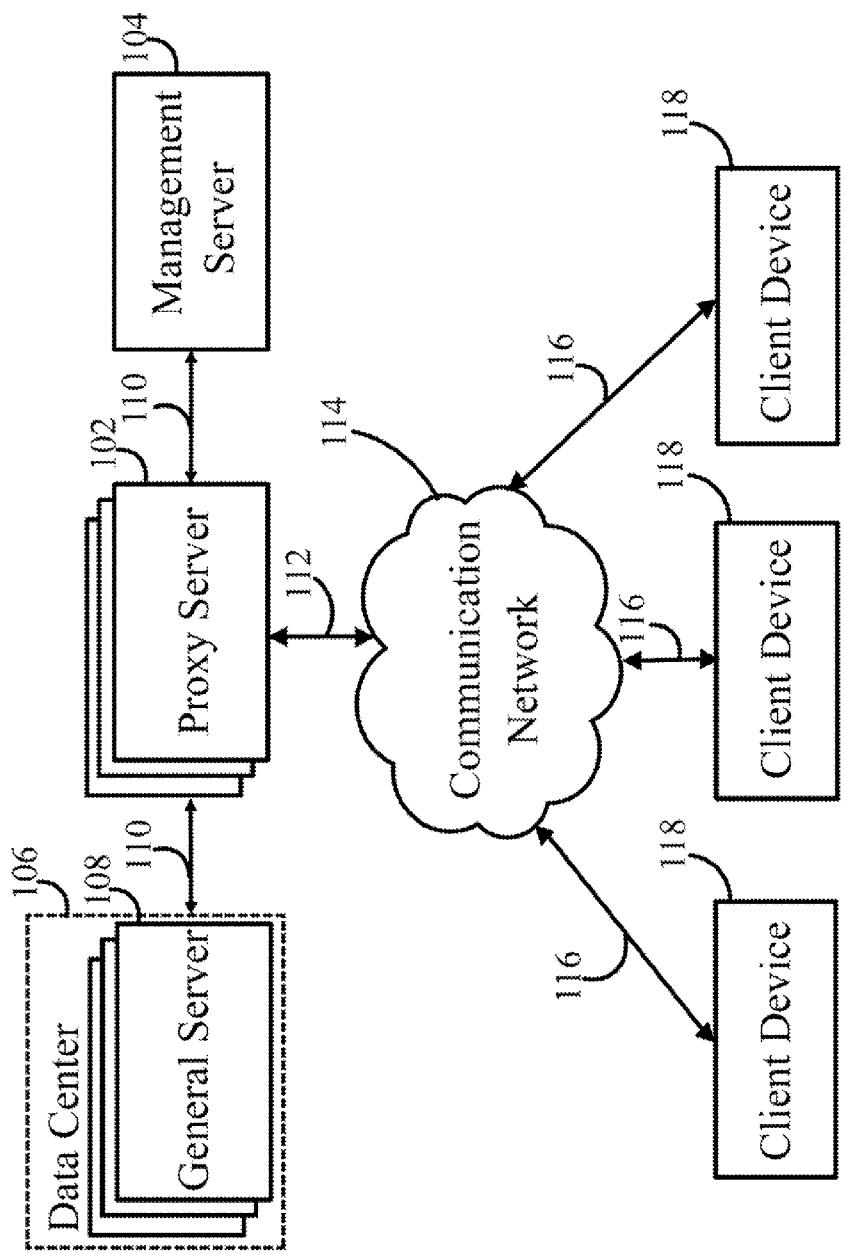
FIG. 1 is a schematic diagram illustrating an example of hardware suitable for the implementation of mechanisms described herein for online server workload management in accordance with some embodiments.

Turning to FIG. 1, an example 100 of a generalized schematic diagram of a system on which the mechanisms for online server workload management as described herein can be implemented in accordance with some implementations, is shown. As illustrated, system 100 can include one or more client devices 118. Client devices 118 can be local to each other or remote from each other. Client devices 118 can be connected by one or more communications links 116 to a communications network 114 that can be linked via a communications link 112 to a proxy server 102.

System 100 can include one or more proxy servers 102. Each of proxy servers 102 can be any suitable proxy server, such as a processor, a computer, a data processing device, or any suitable combination of such devices. In some embodiments, each proxy server can be any suitable front-end server responsible for receiving and routing requests made by the client devices. Any suitable number of proxy servers can be provided. For example, the number of proxy servers can be based on the number of data centers and/or the number of client devices.

System 100 can include one or more data centers 106. In some embodiments, each data center 106 is associated with carbon emission and a total carbon footprint during a time slot.

Each of data centers 106 can include one or more general servers 108. Each general server 108 can be any suitable server, such as a processor, a computer, a data processing device, or any suitable combination of such devices.

Referring to FIG. 1, system 100 can include a centralized management server 104. In some embodiments, management server 104 can be any suitable server, such as a processor, a computer, a data processing device, or any suitable combination of such devices.

In some implementations, each of the client devices 118 and servers 102, 104, and 108 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, client device 118 can be implemented as a personal computer, a laptop computer, a digital media receiver, a tablet computer, any other suitable computing device, or any suitable combination thereof.

Communications network 114 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 110, 112 and 116 can be any communications links suitable for communicating data among client devices 118, proxy server 102, management server 104, and data center 106, such as network links, dial-up links, wireless links, hard-wired links, any other suitable communications links, or any suitable combination of such links. Client devices 118 can enable use of any of the techniques described herein that can allow the features of the mechanisms to be used. Client devices 118 and proxy server 102, management server 104, and data center 106 can be located at any suitable location.

Figure 2:
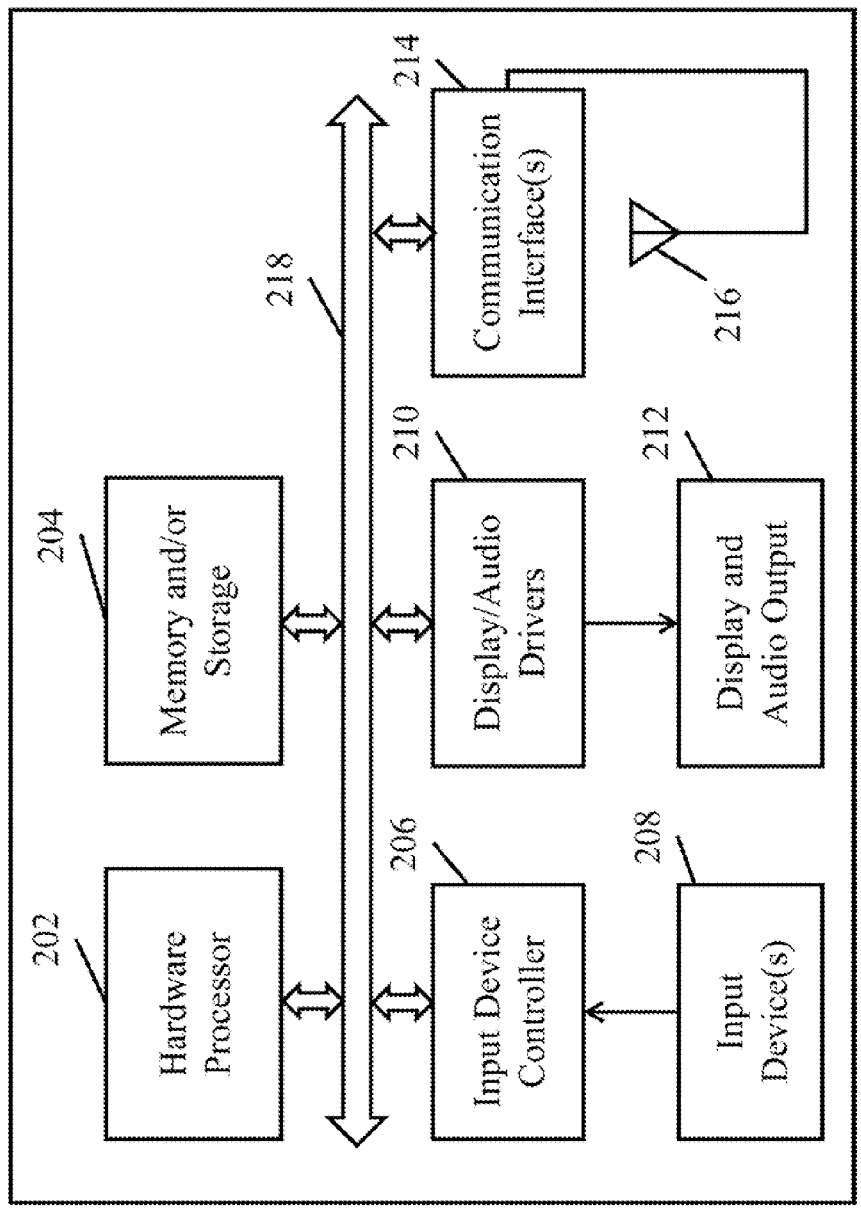
FIG. 2 is a schematic diagram of an example of a server, and/or a computing device of FIG. 1 that can be used in accordance with some embodiments.

FIG. 2 illustrates an example 200 of hardware that can be used to implement proxy server 102, management server 104, general server 108, and/or one or more of client devices 118 depicted in FIG. 1 in accordance with some implementations of the disclosed subject matter. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 114 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

In some implementations, proxy server 102, management server 104, and/or general server 108 can be implemented in one server or can be distributed as any suitable number of servers. For example, multiple servers can be implemented in various locations to increase reliability and/or increase the speed at which the server can communicate with client devices 118.

Figure 3:
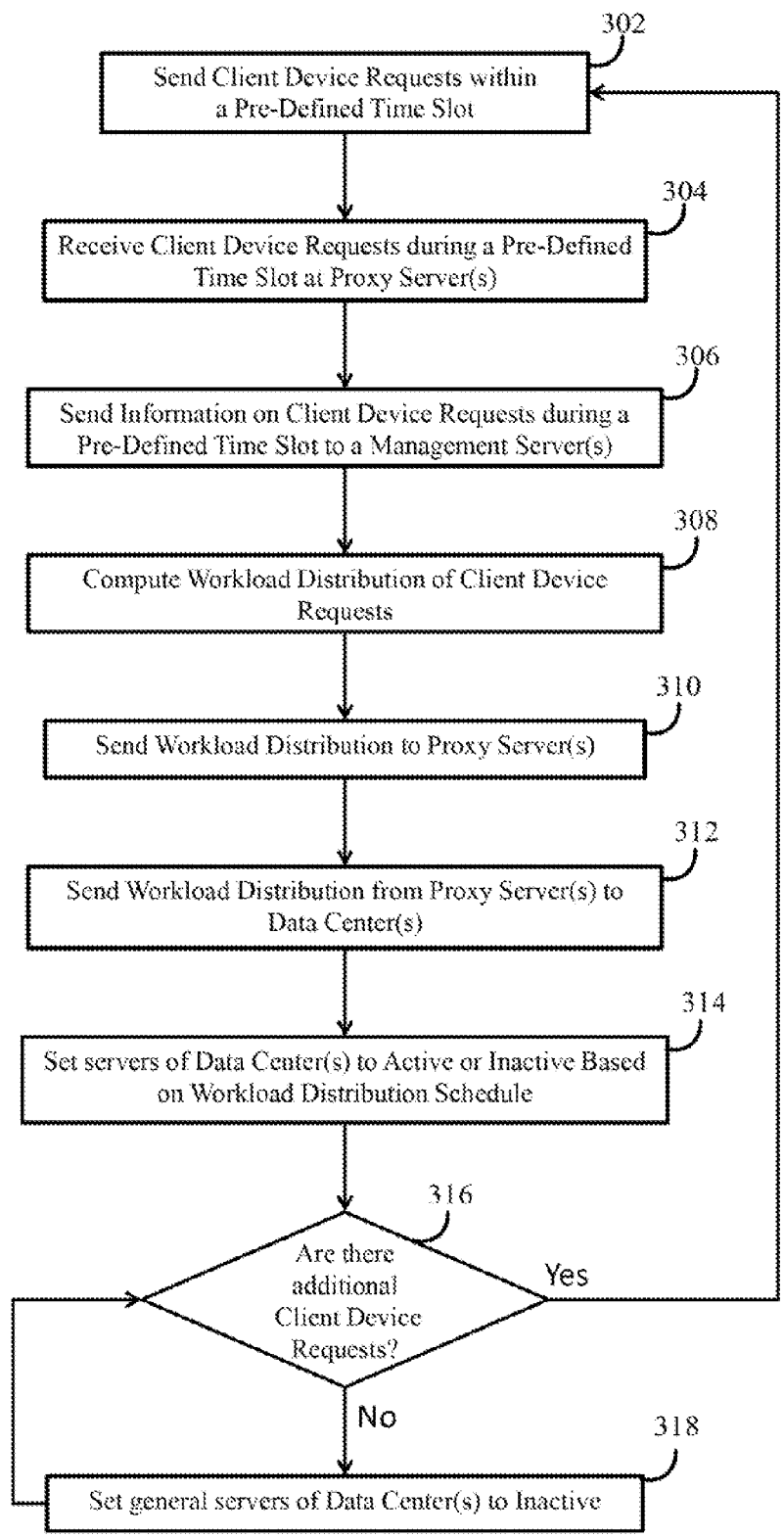
FIG. 3 is a flowchart illustrating an example of steps performed for online server workload management in accordance with some embodiments in the present application.

Turning to FIG. 3, an example 300 of a process for managing online server workload in accordance with some embodiments of the disclosed subject matter is shown.

At 302, client devices 118 can send client device requests during a pre-defined time slot. Client device requests can be any suitable type of requests such as content media requests (e.g., video, audio, and/or text), advertisement requests, web requests, email requests and/or any suitable combination of requests. In some embodiments, the pre-defined time slot can be a period of one hour during a budgeting period.

At 304 the client device requests can be received by one or more proxy servers 102. In some embodiments, client device requests can be received in any suitable manner. For example, client device requests can be received using communication links 110 and 116 via communication network 114 and can be transmitted in any suitable protocol using any suitable type of communication interface, such as TCP/IP and/or HTTP respectively.

At 306, proxy server 102 can send information on the client device requests to a management server 104 via communication link 110. Any suitable information can be sent, such as any suitable information useful to determine a workload distribution as described herein.

In accordance with some embodiments, management server 104 can compute, using a hardware processor 202, at 308, a workload distribution for the client device requests.

At 310, the workload distribution of the client device requests can then be sent to the proxy server 102 via communication link 110, which can subsequently distribute, at 312, the workload distribution to data centers 106. After data centers 106 receive the workload distribution of the client device requests, the data centers can set one or more general servers 108 to active or inactive at 314 according to the workload distribution.

At 316, process 300 can determine whether there are additional client device requests. If not, the general servers of the data centers can be set to inactive and then process 300 can loop back to 316. Otherwise, process 300 can loop back to 302.

In some embodiments, the workload distribution can be determined as follows:

In some embodiments, the service delay (which, along with network delay, can be one of the delays experienced when processing a client device request) can be modeled by using a M/M/n queuing theory model to determine on a number of active servers in a data center in such a way that the average service delay is bounded. For example, a slack can be added to the number of active servers to avoid any sudden increase in service delay due to the input workload spikes during a slot. In the M/M/n model, given that all requests are queued, the average service delay, $\bar{d}$, can be defined as follows:

$$\bar{d} = \frac{1}{\lambda - n\mu},$$

where n denotes the number of servers, $\mu$ denotes the servers' service rate, and $\lambda$ denotes the workload arrival rate.

In some embodiments, $\lambda_j$ can be the time-varying average workload arrival rate at each front-end j. Workload distributions, i.e., $\lambda_{i,j}(t)$, can be determined based on the following constraints and/or any other suitable form of constraints, where $d'^{ref}$ denotes the reference average service delay, $d_{i,j}''(t)$ denotes the average network delay, n denotes the number of active servers to guarantee $d'^{ref}$, $0 \leq y^{slack} \leq 1$ denotes the slack, and y denotes the total number of active servers including the slack:

$$\sum_i \lambda_{i,j}(t) = \lambda_j(t), \forall j, t[\text{service}], \quad (1)$$

$$n_i(t)\mu_i > \sum_j \lambda_{i,j}(t), \forall i, t[\text{queuing stability}],$$

$$\frac{1}{n_i(t)\mu - \sum_j \lambda_{i,j}(t)} \leq d'^{ref}, \forall i, t[\text{service delay}],$$

$$(d^{ref} - (d'^{ref} + d_{i,j}''(t))\lambda_{i,j}(t) \geq 0, \forall i, j, t[\text{total delay}],$$

$$y_i(t) = (1 + y_i^{slack})n_i(t) \leq Y_i, \forall i, t[\text{data center capacity}].$$

In the above, the "service" constraint guarantees providing service for all requests, the "queuing stability" constraint ensures the queuing model convergence, the "service delay" constraint estimates the service delay using the M/M/n queuing model and guarantees maintaining a reference average service delay, and the "total delay" asserts that the sum of service and network delay is below the reference, $d^{ref}$. The equations can be in linear form, specifically by bounding both the service delay and the total delay.

The model can determine the number of active servers based on the input workload in order to use the active servers, on average, near their peak utilization. The average one slot energy consumption of an active server, denoted by $p_i$, can be obtained by profiling ($p_i$ can be estimated by including the per-server data center cooling energy). Then $y_i(t)p_i$ estimates the total one-slot energy consumed by active servers in data center i, denoted by $p_i^{tot}$. The power draw from the grid, $g_i(t)$, and the available renewable energy, $r_i(t)$, can supply the total power demand:

$$p_i^{tot}(t) = g_i(t) + r_i(t), \forall i \text{ and } t. \quad (2)$$

Each data center i is associated with carbon emission intensities for the power source from the grid ($\epsilon_i^g$) and its on-site renewable energy source ($\epsilon_i^r$) measured in units of $CO_2$ g/J. The total carbon footprint of the cloud (i.e., from all of the data centers), within slot t can be written as:

$$\eta(t) = \sum_i \eta_i(t) = \sum_i \epsilon_i^g(t)g_i(t) + \epsilon_i^r(t)r_i(t). \quad (3)$$

The cloud can follow a long-term carbon capping target, denoted by a sum, which is typically expressed for a year of operation of a data center. For example, for $$\bar{\eta} = \frac{\Sigma}{S},$$

the long term carbon capping constraint can be written as follows:

$$\frac{1}{S}\sum_{t=0}^{S-1} \eta(t) \leq \bar{\eta} \quad (4)$$

The focus can be on the electricity operational costs rather than the capital costs (e.g., building data centers, renewable energy installation cost), and the renewable energy operational cost can be set to zero, since the primary cost for solar panels and wind turbines is the construction cost. Further, data centers can maximize the utilization of the on-site renewable energy, in accordance with some embodiments. At each slot t, the operation cost is power procurement cost across all the data centers, i.e., cost(t)=$\sum_i g_i(t)\alpha_i(t)$, where $\alpha$ denotes the electricity cost. Finally, offline workload distribution strategy over the cloud can minimize the long-term average electricity cost of the cloud, which is demonstrated in the following optimization problem, P1:

$$\underset{g,r,y,\lambda}{\text{minimize}} \quad \overline{cost} = \frac{1}{S}\sum_{t=0}^{S-1}\sum_i g_i(t)\alpha_i(t), \quad (5)$$

subject to: (1), (2), and (4).

In some embodiments, some of the variables are real (i.e., $g_i$ and $\lambda_{i,j}$) and some are integers (i.e., $y_i$). It can be shown that the NP-hard Fixed-Charge-Min-Cost-Flow problem can be reduced to P1. However, relaxing y to a real variable can have a very negligible impact on the electricity cost. Therefore, P1 can be solved where all its decision variables are real. In this way, P1 can be solved using linear programming or any other suitable type of programming. Carbon capping constraint (4) couples the solution of P1 over slots. In some embodiments, when solving P1, the following assumptions can be:

Boundedness assumption: The cloud carbon footprint on every slot is upper-bounded by $\eta_{max}$ which implies that the workload arrival rate and the carbon intensity associated with the cloud are finite for t=0, . . . , S−1, that is true due to the finite number of servers in data centers.

Feasibility assumption: There exists at least one sequence of workload distribution policy over slots t=0, . . . , S−1 that satisfy P1's constraints.

Periodicity assumption: There exits θ number of continuous slots, θ<<S, during which, if carbon footprint is minimized (i.e., $\forall k \in \theta$: $\eta(k)=\eta_{min}(k)$, where $\eta_{min}(k)$ is the minimum possible carbon footprint for slot k which can be achieved by any workload distribution policy), then the average carbon footprint over θ becomes lower than that of average carbon cap $\overline{\eta}$. The parameter θ depends on the cycle variation of the cloud carbon footprint as well as the tightness of $\overline{\eta}$, i.e., the proximity of the $\overline{\eta}$ to the minimum feasible average carbon footprint.

In some embodiments, Lyapunov optimization can be used to provide online control of such optimization problems with coupling and/or any other suitable online problem solving technique, such as a Metrical Task System (MTS). In some such embodiments, a (virtual) queue with occupancy X(t) can be constructed to include the total excess carbon footprint beyond the average carbon footprint until the time slot t. Using X(0)=0, the values X(t) can be propagated over slots as follows:

$$X(t+1) = \max[X(t) - \overline{\eta}, 0] + \Sigma_i \eta_i(t) \quad (7)$$

OnlineCC, as given in Algorithm 1 (below), can be used to solve the cost minimization in an online way, in accordance with some embodiments.

---

Algorithm 1 Online CC Algorithm:

Initialize the virtual queue X
for every slot t = 1 ...S (beginning of the slot) do
    Predict the system parameters over slot t
    Solve the following problem, namely P2:
    Minimize:
        $cost_{OnlineCC} = V \Sigma_i g_i(t)\alpha_i(t) + X(t) \Sigma_i \eta_i(t)$   (6)
    Subject to: (1), and (2)
    Update the virtual queue X using (7).
end for

---

OnlineCC, solving the optimization problem P2 in Algorithm 1, requires only the hour-ahead information for the inputs (i.e., $\lambda_j(t)$, $r_i(t)$, $\alpha_i(t)$, $\epsilon_i^g(t)$ and $\epsilon_i^r(t)$), since the problem P2 removes the coupling property of P1 (i.e., removing the constraint (4)). OnlineCC can use the control parameter V that can be adjusted in any suitable form (see Alg. 1) to adjust the cost minimization and carbon capping trade-off.

Lemma 1 (below) can be used to help to prove the worst-case carbon capping violation of OnlineCC. It can be seen that OnlineCC minimizes the weighted sum of electricity cost and carbon footprint, weighted by V and X(t), respectively.

The following lemma presents a condition under which the second term of (6) outweighs its first term such that minimizing carbon footprint yields lesser value for the OnlineCC objective function. Such condition is related to the parameter $X_{lim}$ which is a bound of the electricity cost difference over the carbon footprint difference across data centers for the entire time period. Mathematically, it is represented as:

$$X_{lim} = \frac{c_{max} - c_{min}}{b},$$

where:

$$c_{max} = \max_{i,t}\left(\frac{p_i}{\mu_i}\alpha_i(t)\right),$$

$$c_{min} = \min_{i,t}\left(\frac{p_i}{\mu_i}\alpha_i(t)\right),$$

$$b = \min_{i,k,t,i\neq k}\left(\frac{p_i}{\mu_i}\epsilon_i^g(t) - \frac{p_k}{\mu_k}\epsilon_k^g(t) \,\Big|\, \frac{p_i}{\mu_i}\epsilon_i^g(t) \neq \frac{p_k}{\mu_k}\epsilon_k^g(t)\right).$$

Lemma 1.

Suppose data centers require non-zero active servers, and for a given slot t, $X(t) \geq VX_{lim}$, then OnlineCC minimizes carbon footprint for the current slot.

Building upon Lyapunov optimization, Theorem 1 (below) presents the performance analysis of OnlineCC.

Theorem 1.

(Performance Bound Analysis): Suppose X(0)=0, and that power demands and input workloads of data centers are bounded. Then given any fixed control parameter V>0, the online algorithm, OnlineCC achieves the following:

1) The carbon footprint capping constraint is approximately satisfied with a bounded deviation as follows:

$$\Sigma_{t=0}^{S-1}\Sigma_i\eta_i(t) \leq \Sigma + VX_{lim} + \max(\theta-2,0)(\eta_{max}-\overline{\eta}) + \eta_{max} \quad (8)$$

2) Assume data center parameters are independent and identically distributed over every slot, the time averaged cost under the online algorithm is within B/V of the offline optimal time averaged cost value, cost:

$$\limsup_{t\to\infty} \frac{1}{t}\sum_{\tau=0}^{t-1} \mathbb{E}\{cost_{OnlineCC}(\tau)\} \leq cost^* + \frac{B}{V}, \quad (9)$$

where:

$$B = \frac{1}{2}(\eta_{max}^2 + \overline{\eta}^2)$$

$cost_{OnlineCC}$ refers to the value of (6) as shown in Alg. 1, and $cost^*$ is the optimal solution to P1.

The results of Lemma 1 and (8) are important since they can provide a deterministic bound on the maximum carbon capping violation of OnlineCC. The intuition behind (8) is that the carbon cap violation is bounded by the maximum value that X can get which is equal to the sum of $VX_{lim}$ (e.g., the upper bound value of X to minimize carbon footprint)

and the total carbon footprint backlog accumulated when minimizing carbon footprint in the worst case (i.e., over θ).

These results can also be used to adjust the value of V. OnlineCC uses a control parameter V>0 that affects the distance from optimality. Particularly, according to Theorem 1, the algorithm achieves an average cost no more than O(1/V) distance above the optimal average cost, while the large value of V comes at the expense of an O(V) trade-off in achieving the carbon cap. According to (7), the aggregated carbon violation until time t equals max(X(t)−$\bar{\eta}$). If V=$V_{min}$ were chosen, where $\bar{\eta}$=$V_{min}X_{lim}$, then according to Lemma 1, OnlineCC minimizes carbon footprint whenever either the carbon footprint over a slot exceeds $\bar{\eta}$ (due to peak workload) or the sum of backlog and the slot carbon footprint exceed $\bar{\eta}$. This means that choosing V=$V_{min}$, OnlineCC most of the time yields a lesser value than that of $\bar{\eta}$, since the offline solution does not always minimize the carbon footprint when the workload is at its peak (e.g., for loose $\bar{\eta}$). This is particularly true because $VX_{lim}$ is an upper-bound value for OnlineCC to minimize the carbon footprint. Choosing the right value for V such that OnlineCC achieves near or very close to the carbon cap (Σ) depends on the variability of the electricity cost ($α_i$(t)) and the carbon emission ($η_i$(t)) of data centers over time.

The right V value also depends on θ. Depending on the electricity cost, the optimal offline solution may violate the average carbon cap in some slots, which can be compensated in future slots (depending on θ). One heuristic solution to imitate this behavior, is to choose V such that on average around $$\frac{\theta}{2}\bar{\eta}$$

violation nom average carbon cap is allowed, i.e., V such that $$\frac{\theta}{2}\bar{\eta} = VX_{lim} \text{ or } \frac{\theta}{2}\bar{\eta} = \frac{\theta}{2}X_{min}.$$

Further, in some embodiments, V can be chosen by considering how tight the bound $X_{lim}$ is, which can be approximately calculated using the data center input parameters (i.e., peak to mean ratio of the electricity cost and the carbon intensities).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. A method, using a hardware processor, for online server workload management, the method comprising:
    receiving information regarding client device requests;
    determining, using a hardware processor, a workload distribution for the requests based on electricity cost and carbon footprint of one or more data centers using Lyapunov optimization, wherein the workload distribution minimizes a combination of a cost for electricity for a plurality of servers, and a total excess carbon footprint for the plurality of servers beyond an average carbon footprint multiplied by a total carbon footprint of the plurality of servers and another plurality of servers;
    sending the workload distribution to the one or more data centers; and
    causing servers in the one or more data center to be active or inactive based on the workload distribution.

2. The method of claim 1, wherein the information regarding the client device requests are received from at least one proxy server.

3. The method of claim 1, wherein the workload distribution is sent to the one or more data centers via at least one proxy server.

4. A system for online server workload management comprising:
    at least one hardware processor configured to:
        receive information regarding client device requests;
        determine a workload distribution for the requests based on electricity cost and carbon footprint of one or more data centers using Lyapunov optimization, wherein the workload distribution minimizes a combination of a cost for electricity for a plurality of servers, and a total excess carbon footprint for the plurality of servers beyond an average carbon footprint multiplied by a total carbon footprint of the plurality of servers and another plurality of servers;
        send the workload distribution to the one or more data centers; and
        cause servers in the one or more data center to be active or inactive based on the workload distribution.

5. The system of claim 4, wherein the information regarding the client device requests are received from at least one proxy server.

6. The system of claim 4, wherein the workload distribution is sent to the one or more data centers via at least one proxy server.

7. A non-transitory computer readable medium containing computer-executable instructions that, when executed by a processor, cause the processor to perform methods for online server workload management, the method comprising:
    receiving information regarding client device requests;
    determining a workload distribution for the requests based on electricity cost and carbon footprint of one or more data centers using Lyapunov optimization, wherein the workload distribution minimizes a combination of a cost for electricity for a plurality of servers, and a total excess carbon footprint for the plurality of servers beyond an average carbon footprint multiplied by a total carbon footprint of the plurality of servers and another plurality of servers;

sending the workload distribution to the one or more data centers; and causing servers in the one or more data center to be active or inactive based on the workload distribution.

8. The non-transitory computer readable medium of claim 7, wherein the information regarding the client device requests are received from at least one proxy server.

9. The non-transitory computer readable medium of claim 7, wherein the workload distribution is sent to the one or more data centers via at least one proxy server.

* * * * *